(12) United States Patent
Choi

(10) Patent No.: US 8,353,742 B1
(45) Date of Patent: Jan. 15, 2013

(54) AUTOMATIC SAUSAGE ROLLING MACHINE

(76) Inventor: Young S. Choi, Carrollton, TX (US)

( * ) Notice: Subject to any disclaimer, the term of this patent is extended or adjusted under 35 U.S.C. 154(b) by 0 days.

(21) Appl. No.: 13/460,466

(22) Filed: Apr. 30, 2012

(51) Int. Cl.
*A22C 11/00* (2006.01)

(52) U.S. Cl. .................................................. 452/32

(58) Field of Classification Search ............. 452/21–26, 452/30–32, 35–37, 46–48, 51
See application file for complete search history.

(56) References Cited

U.S. PATENT DOCUMENTS

| | | | |
|---|---|---|---|
| 3,604,367 A * | 9/1971 | Arries | 425/297 |
| 3,622,353 A | 11/1971 | Bradshaw et al. | |
| 3,802,824 A * | 4/1974 | Amster et al. | 425/371 |
| 3,851,554 A | 12/1974 | Papai | |
| 4,014,254 A | 3/1977 | Ohkawa | |
| 4,045,151 A * | 8/1977 | Zazzara | 425/297 |
| 4,276,317 A * | 6/1981 | Hayashi | 426/501 |
| 4,427,357 A * | 1/1984 | Anderson | 425/333 |
| 4,439,124 A | 3/1984 | Watanabe | |
| 4,806,087 A * | 2/1989 | Hayashi | 425/130 |
| 5,037,350 A * | 8/1991 | Richardson et al. | 452/174 |
| 5,190,780 A | 3/1993 | Fehr et al. | |
| 5,198,257 A * | 3/1993 | Heck et al. | 426/282 |
| 6,881,441 B1 * | 4/2005 | Kobayashi et al. | 427/185 |
| 7,156,642 B2 | 1/2007 | Anderson et al. | |
| 7,585,531 B2 | 9/2009 | Baumeister et al. | |
| 7,950,916 B2 | 5/2011 | Baumeister et al. | |
| 2003/0203076 A1 | 10/2003 | Watanabe et al. | |

* cited by examiner

*Primary Examiner* — Richard Price, Jr.
(74) *Attorney, Agent, or Firm* — Richard L. Miller

(57) ABSTRACT

A machine utilizing gravity to reduce costs when rolling a food dough casing around a sausage. The machine includes first, second, and third conveyors, a carrier, and a pusher block. The third conveyor is disposed to one side of the carrier, and is rotatably affixed to a horizontal surface. The second conveyor is rotatably affixed above the third conveyor. The pusher block is disposed to the other side of the carrier, is slidably affixed to the horizontal surface, and pushes the sausage towards the carrier, initially. The first conveyor is rotatably affixed above the pusher block, and conveys the food dough casing initially, and thereafter, the food dough casing falls downwardly by the gravity. The carrier is disposed between the pusher block and the third conveyor, is rotatably affixed to the horizontal surface, and relays a partially food dough cased sausage to between the second conveyor and the third conveyor.

30 Claims, 11 Drawing Sheets

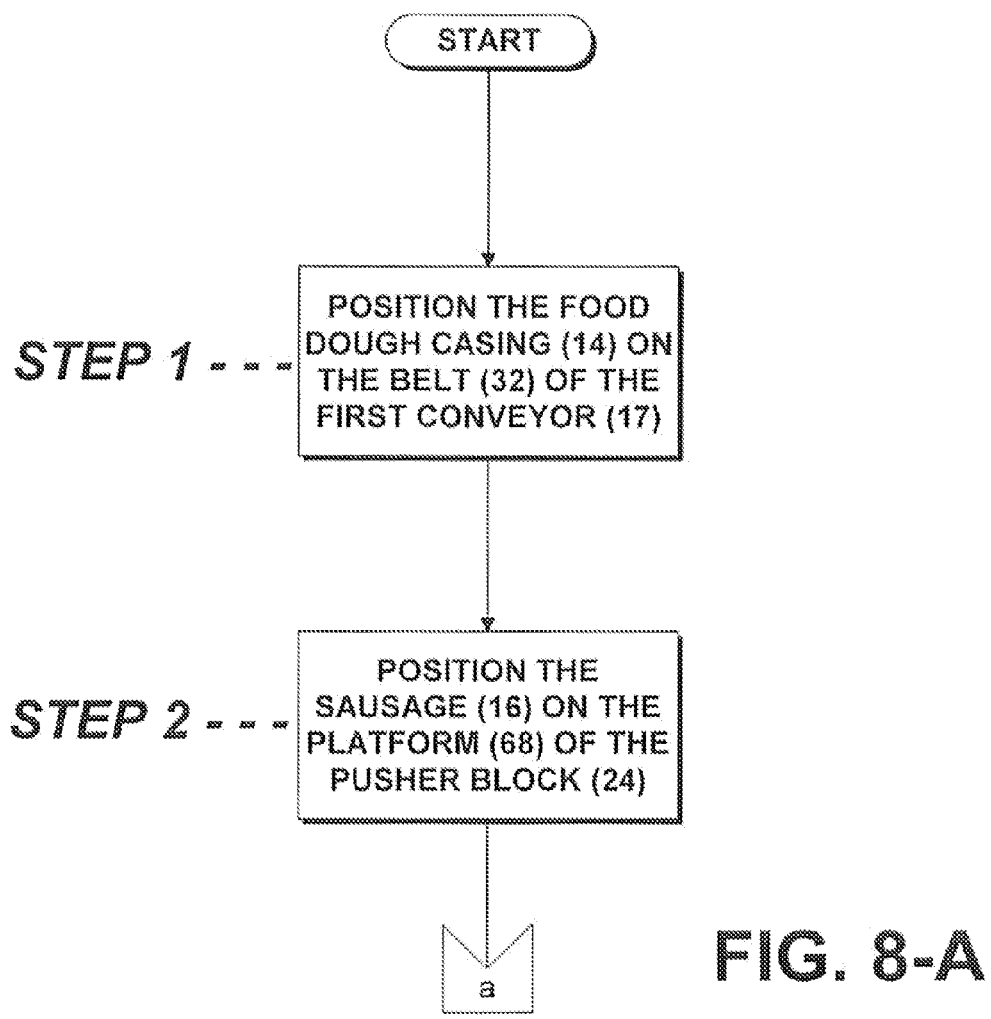

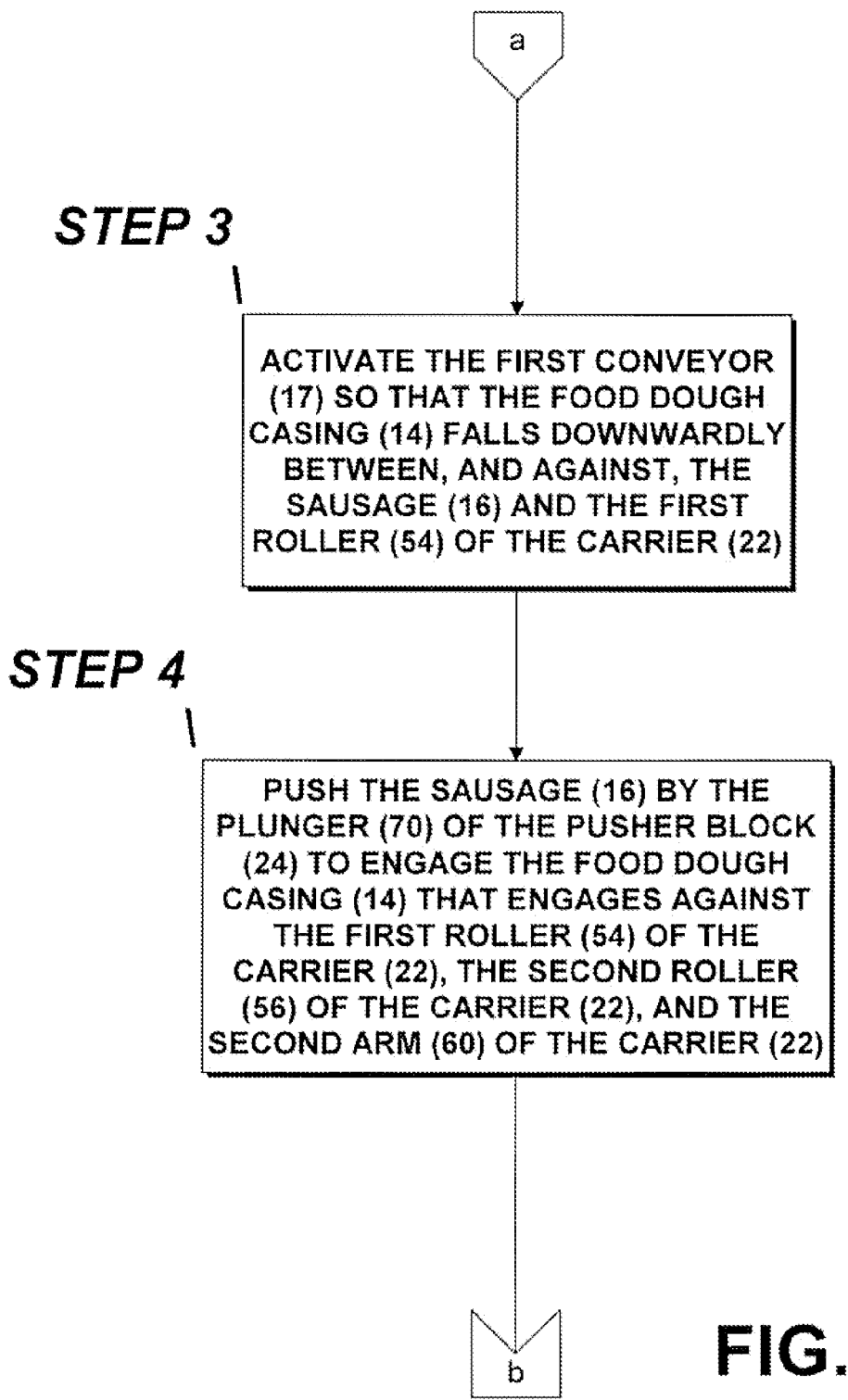
FIG. 8-B

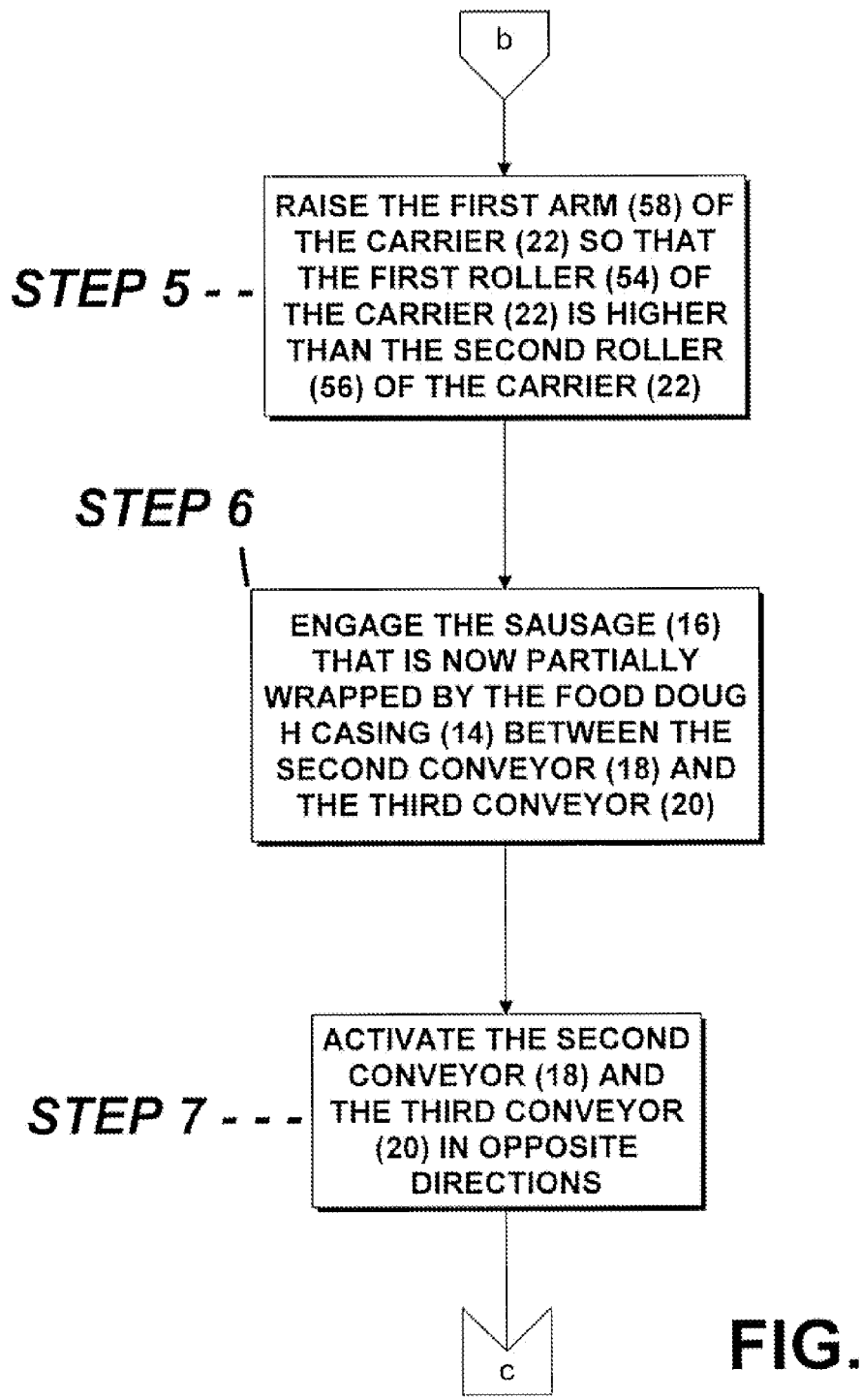
FIG. 8-C

STEP 8
ROLL THE SAUSAGE (16) THAT IS NOW PARTIALLY WRAPPED BY THE FOOD DOUGH CASING (14) BETWEEN, AND AGAINST, THE SECOND CONVEYOR (18) AND THE THIRD CONVEYOR (20) UNTIL THE FOOD DOUGH CASING (14) IS FULLY WRAPPED AROUND THE SAUSAGE (16) SO AS TO FORM A FOOD DOUGH WRAPPED SAUSAGE
STEP 9 - - - EXIT THE FOOD DOUGH WRAPPED SAUSAGE FROM THE MACHINE (10)
END
FIG. 8-D

AUTOMATIC SAUSAGE ROLLING MACHINE

1. BACKGROUND OF THE INVENTION

A. Field of the Invention

The embodiments of the present invention relate to a machine for rolling a food dough casing around a sausage, and more particularly, the embodiments of the present invention relate to a machine for utilizing gravity to reduce costs when rolling a food dough casing around a sausage.

B. Description of the Prior Art

Numerous innovations for foodstuff cores wrapped in foodstuff casings have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach a machine for utilizing gravity to reduce costs when rolling a food dough casing around a sausage.

(1) U.S. Pat. No. 3,622,353 to Bradshaw et al.

U.S. Pat. No. 3,622,353—issued to Bradshaw et al. on Nov. 23, 1971 in U.S. class 426 and subclass 284—teaches collagen-coated food products, particularly sausages, are prepared by extruding the collagen in tubular form upon the foodstuff and then setting it. One or both surfaces of the collagen is/are subjected during extrusion to frictional forces acting about the axis of extrusion. These forces are conveniently applied by contra-rotation of the inner and outer members of the die that is forming the collagen tube. The foodstuff is extruded simultaneously with the collagen through an axial bore in the inner member of the die.

(2) U.S. Pat. No. 3,851,554 to Papai.

U.S. Pat. No. 3,851,554—issued to Papai on Dec. 3, 1974 in U.S. class 83 and subclass 165—teaches an apparatus for applying a sliced meat product to pastry, and which includes relatively movable rotatable cutting apparatus and meat supporting apparatus, and apparatus for guiding meat supplies to a predetermined location on the pastry shell.

(3) U.S. Pat. No. 4,014,254 to Ohkawa.

U.S. Pat. No. 4,014,254—issued to Ohkawa on Mar. 29, 1977 in U.S. class 99 and subclass 450.6—teaches a device for wrapping pre-cut dough sheets around a mixture of minced vegetables, meat, and the like, to make rolled food. The device includes a device for supplying the mixture to the dough sheets, a device for doubling the filled dough sheets, and a device for folding over the filled and doubled dough sheets.

(4) U.S. Pat. No. 4,439,124 to Watanabe.

U.S. Pat. No. 4,439,124—issued to Watanabe on Mar. 27, 1984 in U.S. class 425 and subclass 112—teaches a machine for automatically making rolled food products, such as spring rolls, crepes, or the like, by rolling a food stuffing in a generally rectangular edible skin having first and second diagonally opposite corner areas and third and fourth diagonally opposite corner areas including a filling device for filling the food stuffing in the edible skin at a location on one side of the diagonal line of the shape of the skin adjacent the first corner area while the skin is placed on a support table. The machine also includes a folding device effective to fold the first corner area of the skin that has been filled with the food stuffing so as to overlay the food stuffing and then turn backwards and also to fold the third and fourth corner area on respective sides of the food stuffing so as to overlay the food stuffing at a location opposite to the portion of the food stuffing where the first corner area has overlaid, and a rolling device for rolling the second corner area of the skin up around the food stuffing to complete the formation of the egg roll, spring roll, crepe, or the like.

(5) U.S. Pat. No. 5,190,780 to Fehr et al.

U.S. Pat. No. 5,190,780—issued to Fehr et al. on Mar. 2, 1993 in U.S. class 426 and subclass 502—teaches a method for the production of a generally-cylindrical overlapped-folded, loaded, rolled dough food product. The method includes the following interrelated steps: a) providing a substantially square sheet of dough at a diamond orientation at a first discrete stationary zone; b) advancing that sheet of dough at its diamond orientation from the first discrete stationary zone to at least one foodstuff dispensing zone downstream thereof, stopping the advancing at the foodstuff dispensing zone, and loading at least one foodstuff thereon in a particular manner as fully described; c) advancing that sheet of dough that is loaded with at least one foodstuff to a loaded dough sheet folding zone downstream thereof, stopping the advancing at the folding zone, and folding opposed transverse corners of the diamond-shaped and loaded sheet of dough inwardly in a particular manner as fully described to form a substantially-hexagonally-shaped sheet of dough; d) advancing that substantially hexagonally-shaped, overlapped-folded, loaded sheet of dough to a loaded, folded dough sheet rolling zone downstream thereof, stopping the advancing at the rolling zone, and rolling the substantially-hexagonally-shaped, overlapped-folded, loaded sheet of dough, in a particular manner as fully described to form a generally-cylindrical dough product; and e) discharging the generally-cylindrical, overlapped-folded, loaded, rolled dough product to a discharge zone.

(6) United States Patent Application Publication Number 2003/0203076 to Watanabe et al.

United States Patent Application Publication Number 2003/0203076 published to Watanabe et al. on Oct. 30, 2003 in U.S. 426 and subclass 94—teaches a heat-treated food that has been wrapped in a pastry of wheat flour dough for cooking in a microwave oven, and which is capable of reproducing the so-called crispy feeling, as well as favorable flavor and taste just cooked. The heat-treated food tends to migrate water to the heat-treated surface from the inside ingredients during its distribution and storage terms. The inside ingredients of the heat-treated food have been wrapped in a pastry of wheat flour dough for cooking in a microwave oven and whose heat-treated surface is in contact with a microwave heat susceptor.

(7) U.S. Pat. No. 7,156,642 to Anderson et al.

U.S. Pat. No. 7,156,642—issued to Anderson et al. on Jan. 2, 2007 in U.S. class 425 and subclass 297—teaches a dough-rolling apparatus and method for rolling sheeted dough, which includes a dough-rolling apparatus having a dough sheeter, a sheeting conveyor having a ramped section, a roll-initiating curtain positioned above the ramped section, and a roll-completing curtain positioned above the conveyor and downstream from the roll-initiating conveyor. Sheeted and cut dough pieces are deposited onto a steel mesh and partially-ramped sheeter belt where two wire-mesh rolling curtains are draped onto the sheeter belt to induce rolling of the dough pieces.

(8) U.S. Pat. No. 7,585,531 to Baumeister et al.

U.S. Pat. No. 7,585,531—issued to Baumeister et al. on Sep. 8, 2009 in U.S. class 426 and subclass 439—teaches a method for producing a rolled snack piece using an extruder having typically a plurality of orifices through which an extrudate exits the extruder. Each of these orifices is spiral shaped. When a desired length of extrudate stream or rope protrudes from an orifice, it is cut at its base, thus producing individual snack pieces that appear to have been rolled after being sheeted.

(9) U.S. Pat. No. 7,950,916 to Baumeister et al.

U.S. Pat. No. 7,950,916—issued to Baumeister et al. on May 31, 2011 in U.S. class 425 and subclass 376.1—teaches an apparatus for producing a rolled snack piece using an extruder having typically a plurality of orifices through which an extrudate exits the extruder. Each of these orifices is spiral shaped. When a desired length of extrudate stream or rope protrudes from an orifice, it is cut at its base, thus producing individual snack pieces that appear to have been rolled after being sheeted.

It is apparent that numerous innovations for foodstuff cores wrapped in foodstuff casings have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a machine for utilizing gravity to reduce costs when rolling a food dough casing around a sausage.

2. SUMMARY OF THE INVENTION

Thus, an object of the embodiments of the present invention is to provide a machine for utilizing gravity to reduce costs when rolling a food dough casing around a sausage, which avoids the disadvantages of the prior art.

Briefly stated, another object of the embodiments of the present invention is to provide a machine utilizing gravity to reduce costs when rolling a food dough casing around a sausage. The machine includes a first conveyor, a second conveyor, a third conveyor, a carrier, and a pusher block. The third conveyor is disposed to one side of the carrier, and is rotatably affixed to a horizontal surface. The second conveyor is rotatably affixed above the third conveyor. The pusher block is disposed to the other side of the carrier, is slidably affixed to the horizontal surface, and pushes the sausage towards the carrier, initially. The first conveyor is rotatably affixed above the pusher block, and conveys the food dough casing initially, and thereafter, the food dough casing falls downwardly by the gravity. The carrier is disposed between the pusher block and the third conveyor, is rotatably affixed to the horizontal surface, and relays a partially food dough cased sausage to between the second conveyor and the third conveyor.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows.

Figure 1:
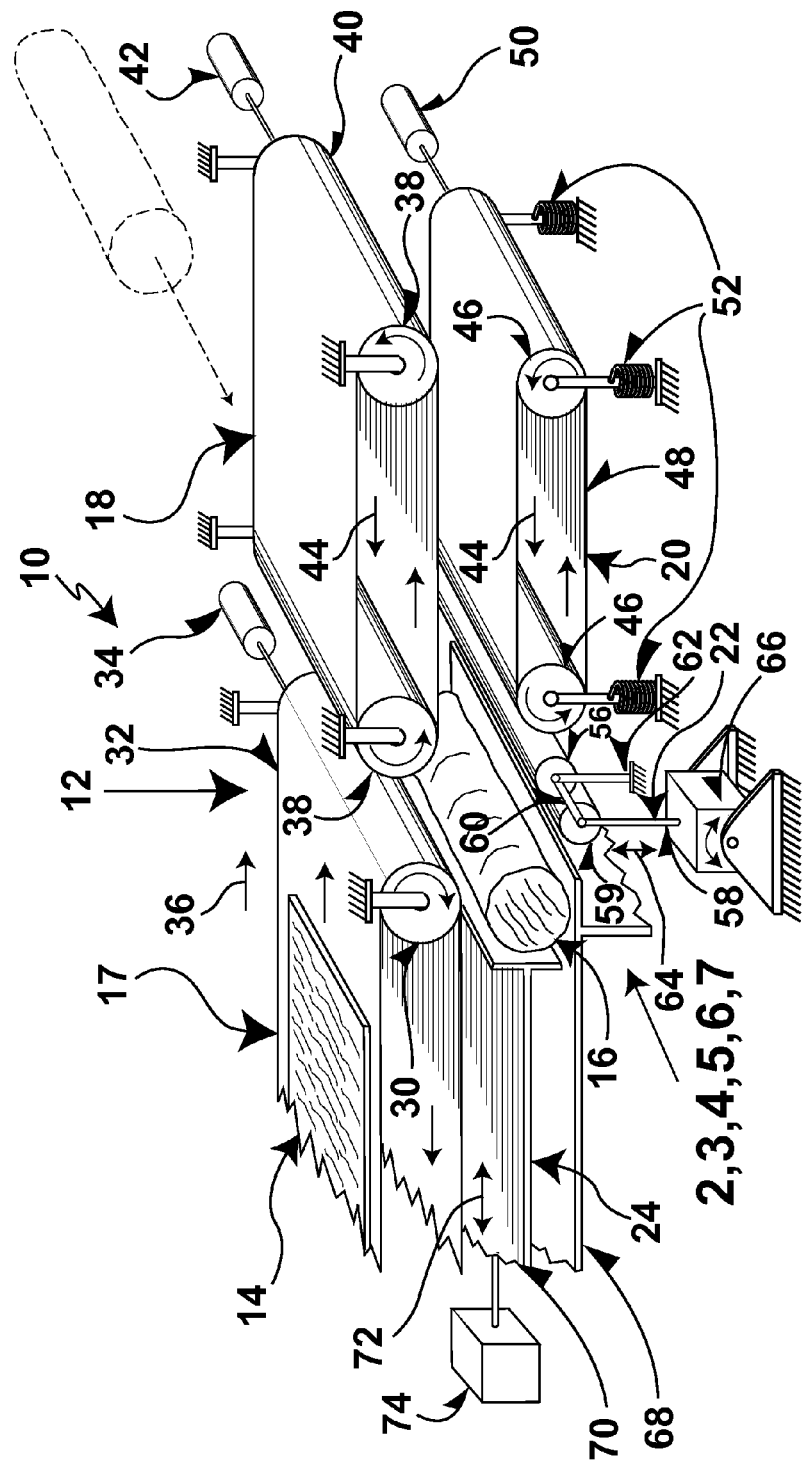
FIG. 1 is a diagrammatic perspective view of the machine of the embodiments of the present invention utilizing gravity to reduce costs when rolling a food dough casing around a sausage.
Figure 7:
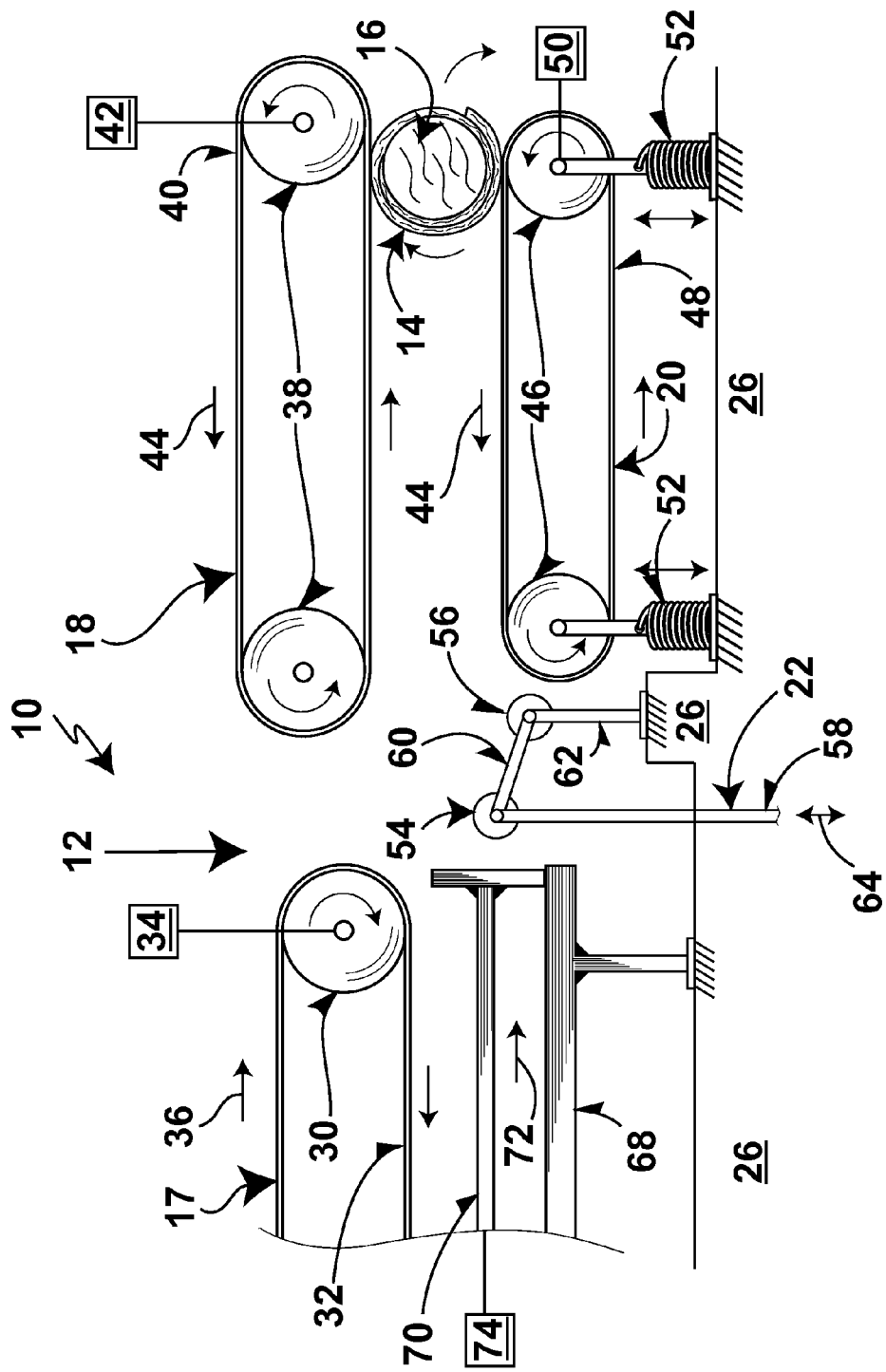

FIG. 7 is an enlarged diagrammatic side elevational view taken generally in the direction of ARROW 7 in FIG. 1 illustrating a final maneuver of the machine of the embodiments of the present invention; and FIGS. 8A-8D are a flow chart of the method for using the machine of the embodiments of the present invention that utilizes gravity to reduce costs when rolling a food dough casing around a sausage.

4. LIST OF REFERENCE NUMERALS UTILIZED IN THE FIGURES OF THE DRAWING

A. Introductory 10 machine of embodiments of present invention for utilizing gravity 12 to reduce costs when rolling food dough casing 14 around sausage 16

12 gravity 14 food dough casing 16 sausage

B. Overall and Specific Configurations, Respectively, of Machine 10

17 first conveyor for conveying food dough casing 14 initially, and thereafter, food dough casing 14 falls downwardly by gravity 12

18 second conveyor 20 third conveyor for rotatably affixing to horizontal surface 26

22 carrier for rotatably affixing to horizontal surface 26, and for relaying partially food dough cased sausage 28 to between second conveyor and third conveyor 24 pusher block for slidably affixing to horizontal surface 26, and for pushing sausage 16 towards carrier 22, initially 26 horizontal surface 28 partially food dough cased sausage (1) Specific Configuration of First Conveyor 17.

30 pair of rollers of first conveyor 17

32 belt of first conveyor 17 for conveying food dough casing 14, initially 34 motor of first conveyor 17

36 first direction of belt 32 of first conveyor 17

(2) Specific Configuration of Second Conveyor 18.

38 pair of rollers of second conveyor 18

40 belt of second conveyor 18

42 motor of second conveyor 18

44 second direction of belt 40 of second conveyor 18

(3) Specific Configuration of Third Conveyor 20.

46 pair of rollers of third conveyor 20

48 belt of rollers of third conveyor 20

50 motor of third conveyor 20

52 plurality of spring dampeners of third conveyor 20 for operatively connecting pair of rollers 46 of third conveyor 20 to horizontal surface 26 and for dampening unwanted movement of third conveyor 20 relative to horizontal surface 26 and to accommodate for increasing the thickness of the dough casing around the sausage (4) Specific Configuration of Carrier 22.

54 first roller of carrier 22
56 second roller of carrier 22
58 first arm of carrier 22
60 second arm of carrier 22
62 third arm of carrier 22 for fixedly attaching to horizontal surface 26 so as to maintain second roller 56 of carrier 22 in same position relative to horizontal surface 26
64 vertical direction of first arm 58 of carrier 22
66 actuator of carrier 22

(5) Specific Configuration of Pusher Block 24.

68 platform of pusher block 24 for fixedly attaching to horizontal surface 26, and for having sausage 16 roll therealong
70 plunger of pusher block 24 for pushing and rolling sausage 16 towards carrier 22
72 direction of plunger 70 of pusher block 24
74 actuator of pusher block 24

5. DETAILED DESCRIPTION OF THE PREFERRED EMBODIMENTS

A. Introductory

Referring now to the figures, in which like numerals indicate like parts, and particularly to FIG. 1, which is a diagrammatic perspective view of the machine of the embodiments of the present invention utilizing gravity to reduce costs when rolling a food dough casing around a sausage, the machine of the embodiments of the present invention is shown generally at 10 for utilizing gravity 12 to reduce costs when rolling a food dough casing 14 around a sausage 16.

B. Overall and Specific Configurations, Respectively, of the Machine 10

The overall and specific configurations, respectively, of the machine 10 can best be seen in FIGS. 1-7, which are, respectively, again a diagrammatic perspective view of the machine of the embodiments of the present invention utilizing gravity to reduce costs when rolling a food dough casing around a sausage, an enlarged diagrammatic side elevational view taken generally in the direction of ARROW 2 in FIG. 1 illustrating an initial maneuver of the machine of the embodiments of the present invention, an enlarged diagrammatic side elevational view taken generally in the direction of ARROW 3 in FIG. 1 illustrating a next maneuver of the machine of the embodiments of the present invention, an enlarged diagrammatic side elevational view taken generally in the direction of ARROW 4 in FIG. 1 illustrating a next maneuver of the machine of the embodiments of the present invention, an enlarged diagrammatic side elevational view taken generally in the direction of ARROW 5 in FIG. 1 illustrating a next maneuver of the machine of the embodiments of the present invention, an enlarged diagrammatic side elevational view taken generally in the direction of ARROW 6 in FIG. 1 illustrating a next maneuver of the machine of the embodiments of the present invention, and an enlarged diagrammatic side elevational view taken generally in the direction of ARROW 7 in FIG. 1 illustrating a final maneuver of the machine of the embodiments of the present invention, and as such, will be discussed with reference thereto.

The machine 10 comprises a first conveyor 17, a second conveyor 18, a third conveyor 20, a carrier 22, and a pusher block 24.

The third conveyor 20 is disposed to one side of the carrier 22, and is for rotatably affixing to a horizontal surface 26.

The second conveyor 18 is rotatably affixed above the third conveyor 20.

The pusher block 24 is disposed to the other side of the carrier 22, is for slidably affixing to the horizontal surface 26, and is for pushing the sausage 16 towards the carrier 22, initially.

The first conveyor 17 is rotatably affixed above the pusher block 24, and is for conveying the food dough casing 14 initially, and thereafter, the food dough casing 14 falls downwardly by the gravity 12.

The carrier 22 is disposed between the pusher block 24 and the third conveyor 20, is for rotatably affixing to the horizontal surface 26, and is for relaying a partially food dough cased sausage 28 to between the second conveyor 18 and the third conveyor 20.

The first conveyor 17, the second conveyor 18, the third conveyor 20, and the pusher block 24 are at different elevations for allowing the gravity 12 to assist the machine 10 in reducing costs when rolling the food dough casing 14 around the sausage 16.

(1) Specific Configuration of the First Conveyor 17.

The first conveyor 17 comprises a pair of rollers 30 and a belt 32, is horizontally oriented, and is for conveying the food dough casing 14, initially.

The first conveyor 17 further comprises a motor 34.

The motor 34 of the first conveyor 17 is operatively connected to one roller 30 of the first conveyor 17 so as to move the belt 32 of the first conveyor 17, with the food dough casing 14 thereon, in a first direction 36 towards the second conveyor 18.

(2) Specific Configuration of the Second Conveyor 18.

The second conveyor 18 comprises a pair of rollers 38 and a belt 40, is horizontally oriented, and is positioned parallel to, slightly above, and horizontally spaced from, the first conveyor 17.

The second conveyor 18 further comprises a motor 42.

The motor 42 of the second conveyor 18 is operatively connected to one roller 38 of the second conveyor 18 so as to move the belt 40 of the second conveyor 18 in a second direction 44 towards the first conveyor 17 at 100-150 RPM.

(3) Specific Configuration of the Third Conveyor 20.

The third conveyor 20 comprises a pair of rollers 46 and a belt 48, is horizontally oriented, and is positioned parallel to, and below, the first conveyor 17 and the second conveyor 18, and is spaced horizontally from the first conveyor 17.

The third conveyor 20 further comprises a motor 50.

The motor 50 of the third conveyor 20 is operatively connected to one roller 46 of the third conveyor 20 so as to move the belt 46 of the third conveyor 20 in the second direction 44 towards the first conveyor 17 at 15-20 RPM.

The third conveyor 20 further comprises a plurality of spring dampeners 52.

The plurality of spring dampeners 52 of the third conveyor 20 are operatively connected to the pair of rollers 46 of the third conveyor 20, are for operatively connecting the pair of rollers 46 of the third conveyor 20 to the horizontal surface 26, and are for dampening unwanted movement of the third conveyor 20 relative to the horizontal surface 26, and to accommodate for increasing the thickness of the dough casing around the sausage.

(4) Specific Configuration of the Carrier 22.

The carrier 22 comprises a first roller 54, a second roller 56, a first arm 58, a second arm 60, and a third arm 62.

The first roller 54 of the carrier 22 is parallel to, and is spaced apart from, the second roller 56 of the carrier 22.

The first roller 54 of the carrier 22 is movably attached to the second roller 56 of the carrier 22 by the second arm 60 of the carrier 22, with the second arm 60 of the carrier 22 moving in a third direction 63.

The third arm 62 of the carrier 22 is rotatably attached to the second roller 56 of the carrier 22, and is for fixedly attaching to the horizontal surface 26 so as to maintain the second roller 56 of the carrier 22 in a same position relative to the horizontal surface 26.

The first arm 58 of the carrier 22 is movably attached to the first roller 54, and moves the first roller 54 of the carrier in a vertical direction 64.

The carrier 22 further comprises an actuator 66.

The actuator 66 of the carrier 22 is operatively connected to, and is disposed below, the first arm 58 of the carrier 22, and thereby, moves the first roller 54 of the carrier in the vertical direction 64 via the first arm 58 of the carrier 22.

(5) Specific Configuration of the Pusher Block 24.

The pusher block 24 comprises a platform 68 and a plunger 70.

The platform 68 of the pusher block 24 is horizontally oriented, is for fixedly attaching to the horizontal surface 26, and is for having the sausage 16 roll therealong.

The plunger 70 of the pusher block 24 is horizontally oriented, slides along the platform 68 of the pusher block 24 in a direction 72, which includes both the first direction 36 and the second direction 44, and is for pushing and rolling the sausage 16 towards the carrier 22.

The pusher block 24 further comprises an actuator 74.

The actuator 74 of the pusher block 24 is operatively connected to, slide in the direction 72, the plunger 70 of the pusher block 24.

C. Method for Using the Machine 10 that Utilizes Gravity 12 to Reduce Costs When Rolling a Food Dough Casing 14 Around a Sausage 16

The method for using the machine 10 can best be seen in FIGS. 2-7 and 8A-8D, which are, respectively, again a diagrammatic perspective view of the machine of the embodiments of the present invention utilizing gravity to reduce costs when rolling a food dough casing around a sausage, again an enlarged diagrammatic side elevational view taken generally in the direction of ARROW 2 in FIG. 1 illustrating an initial maneuver of the machine of the embodiments of the present invention, again an enlarged diagrammatic side elevational view taken generally in the direction of ARROW 3 in FIG. 1 illustrating a next maneuver of the machine of the embodiments of the present invention, again an enlarged diagrammatic side elevational view taken generally in the direction of ARROW 4 in FIG. 1 illustrating a next maneuver of the machine of the embodiments of the present invention, again an enlarged diagrammatic side elevational view taken generally in the direction of ARROW 5 in FIG. 1 illustrating a next maneuver of the machine of the embodiments of the present invention, again an enlarged diagrammatic side elevational view taken generally in the direction of ARROW 6 in FIG. 1 illustrating a next maneuver of the machine of the embodiments of the present invention, again an enlarged diagrammatic side elevational view taken generally in the direction of ARROW 7 in FIG. 1 illustrating a final maneuver of the machine of the embodiments of the present invention, and a flow chart of the method for using the machine of the embodiments of the present invention that utilizes gravity to reduce costs when rolling a food dough casing around a sausage, and as such, will be discussed with reference thereto.

Figure 2:
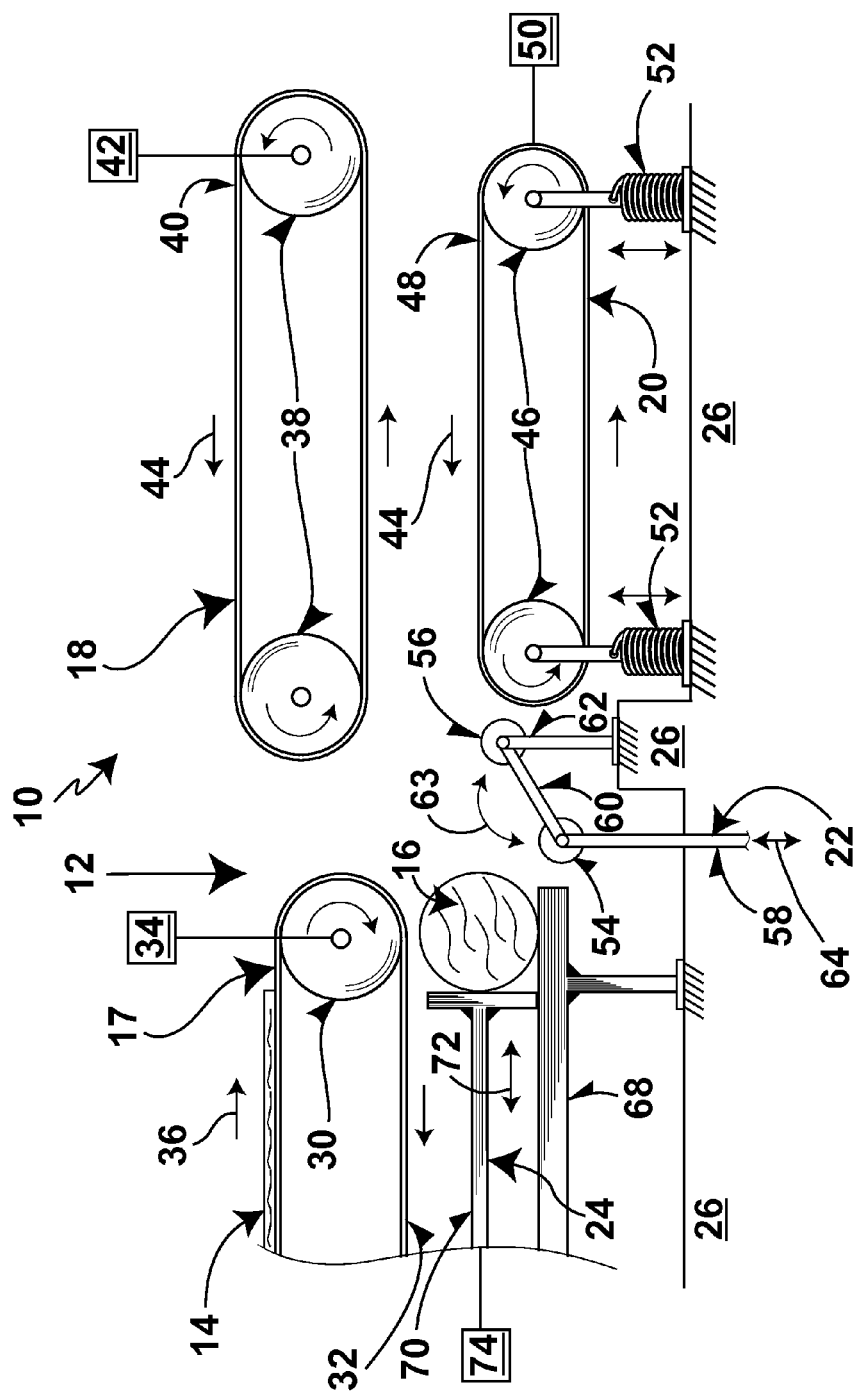
FIG. 2 is an enlarged diagrammatic side elevational view taken generally in the direction of ARROW 2 in FIG. 1 illustrating an initial maneuver of the machine of the embodiments of the present invention.
Figure 3:
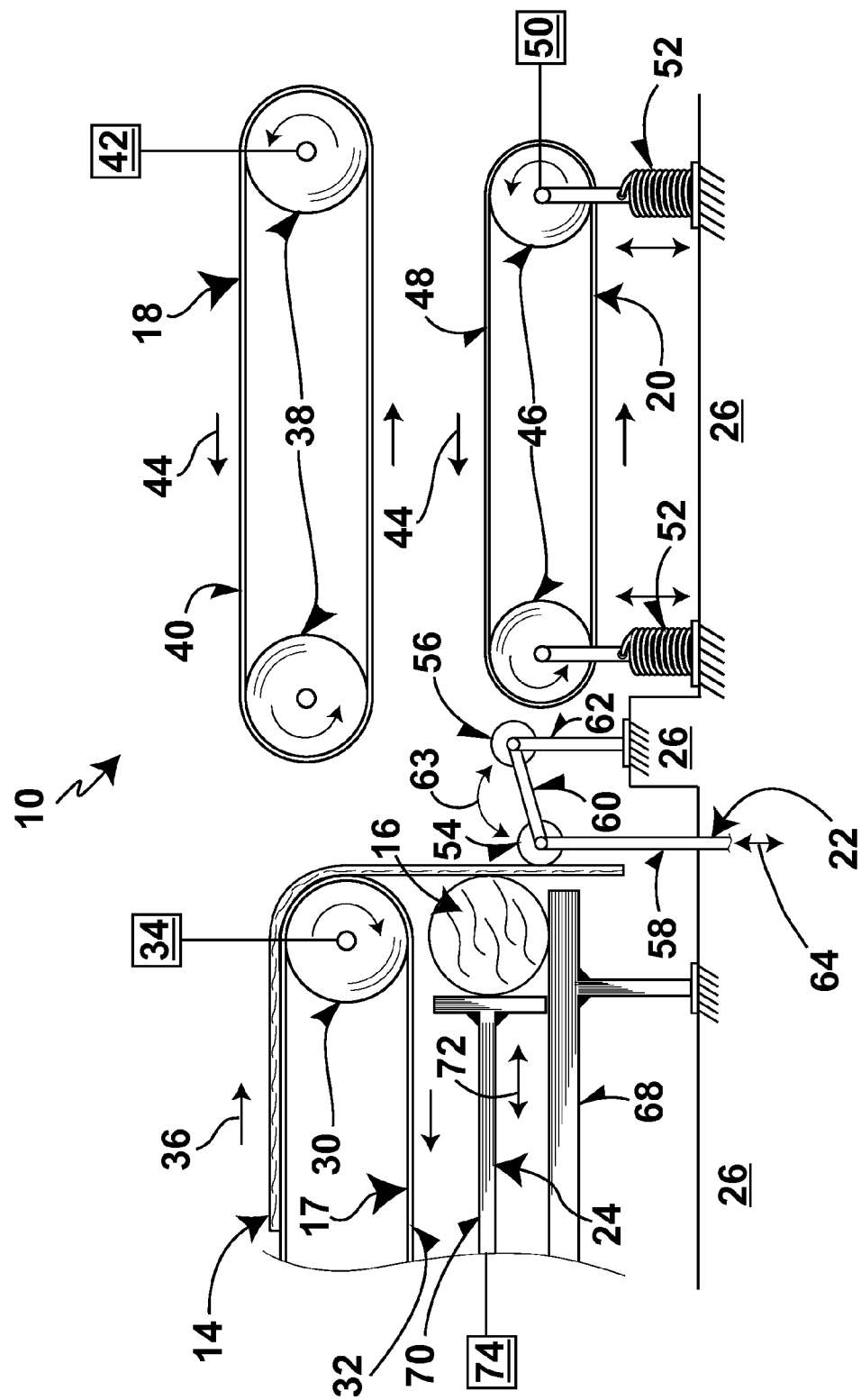
FIG. 3 is an enlarged diagrammatic side elevational view taken generally in the direction of ARROW 3 in FIG. 1 illustrating a next maneuver of the machine of the embodiments of the present invention.
Figure 4:
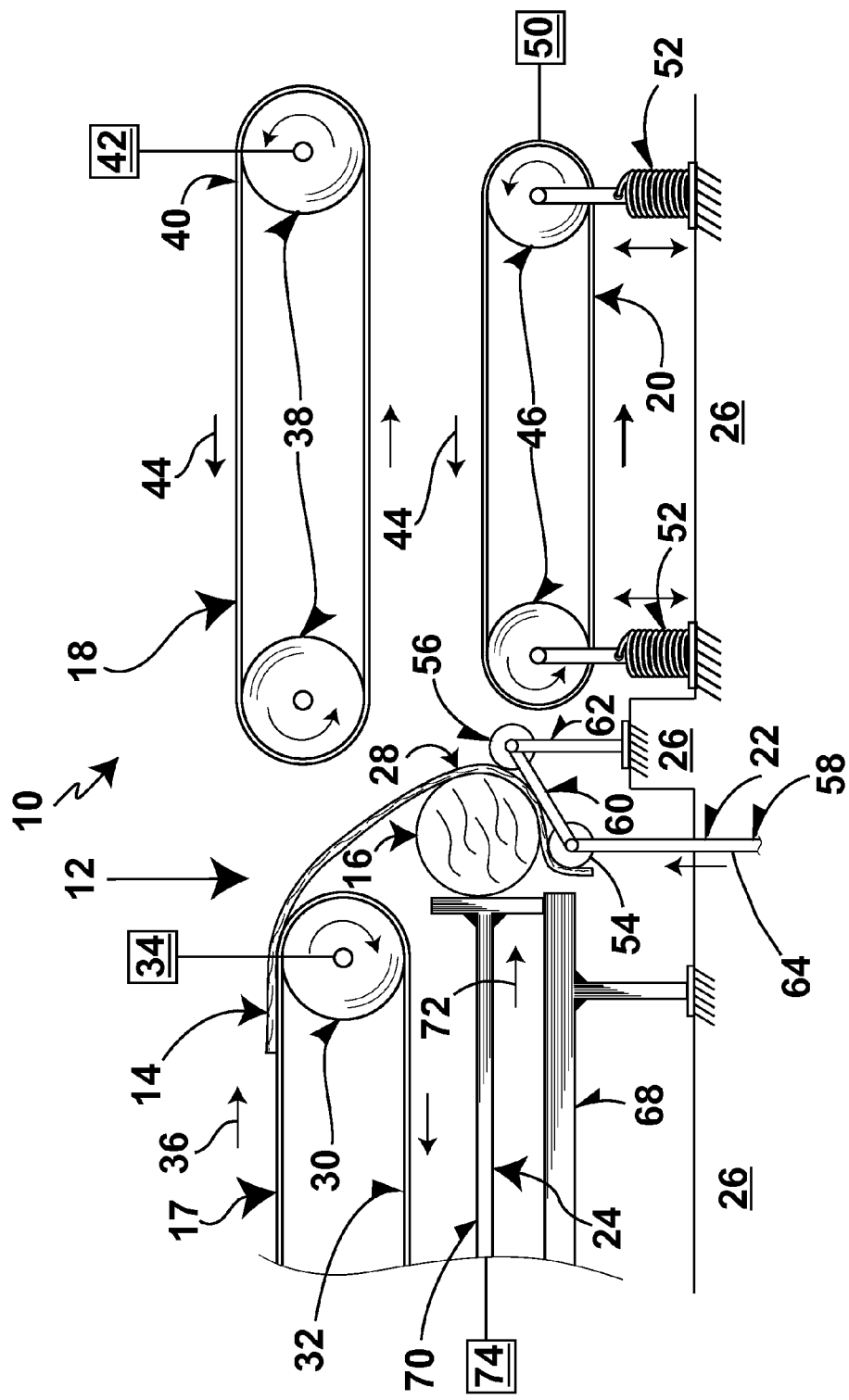
FIG. 4 is an enlarged diagrammatic side elevational view taken generally in the direction of ARROW 4 in FIG. 1 illustrating a next maneuver of the machine of the embodiments of the present invention
Figure 5:
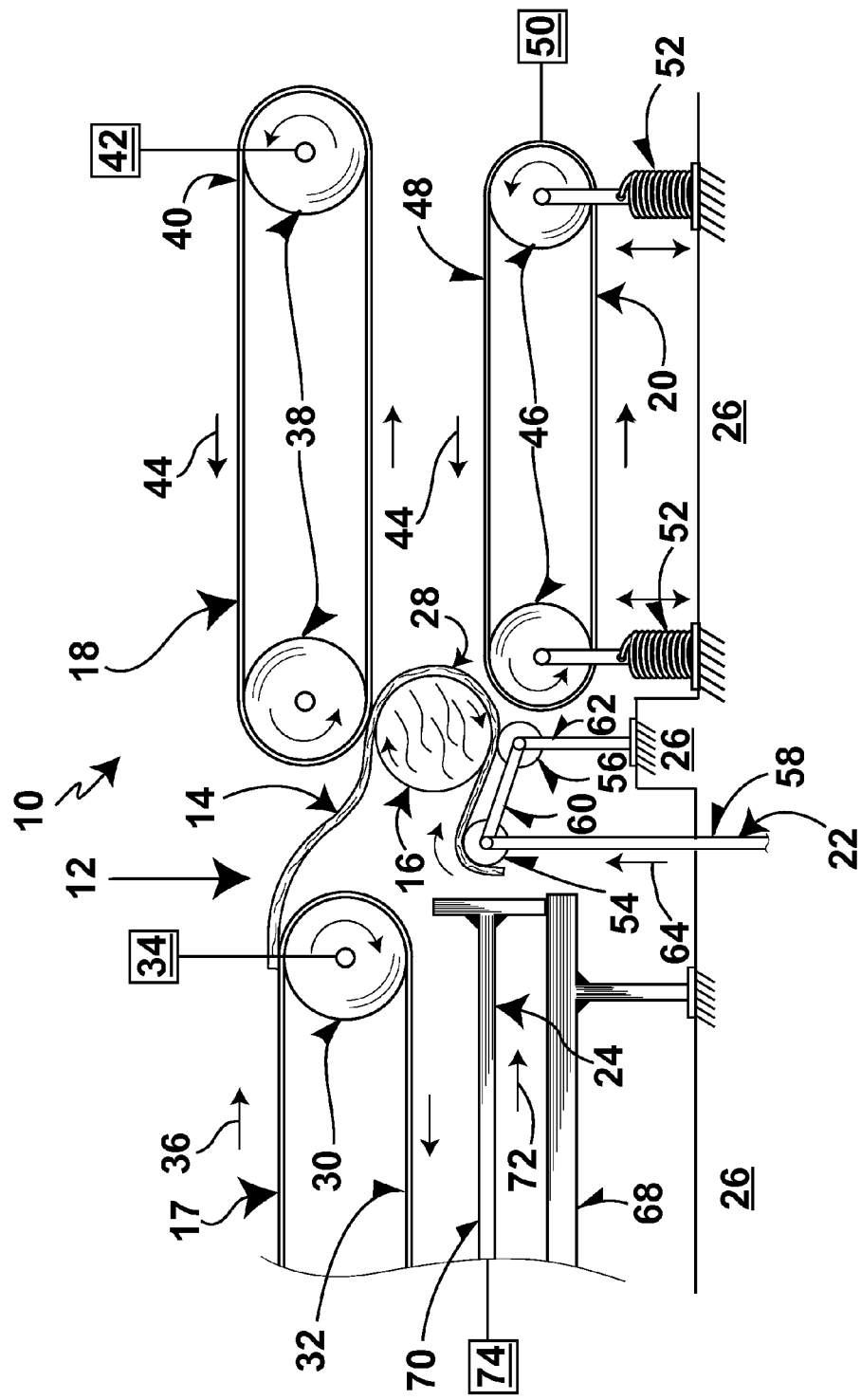
FIG. 5 is an enlarged diagrammatic side elevational view taken generally in the direction of ARROW 5 in FIG. 1 illustrating a next maneuver of the machine of the embodiments of the present invention.
Figure 6:
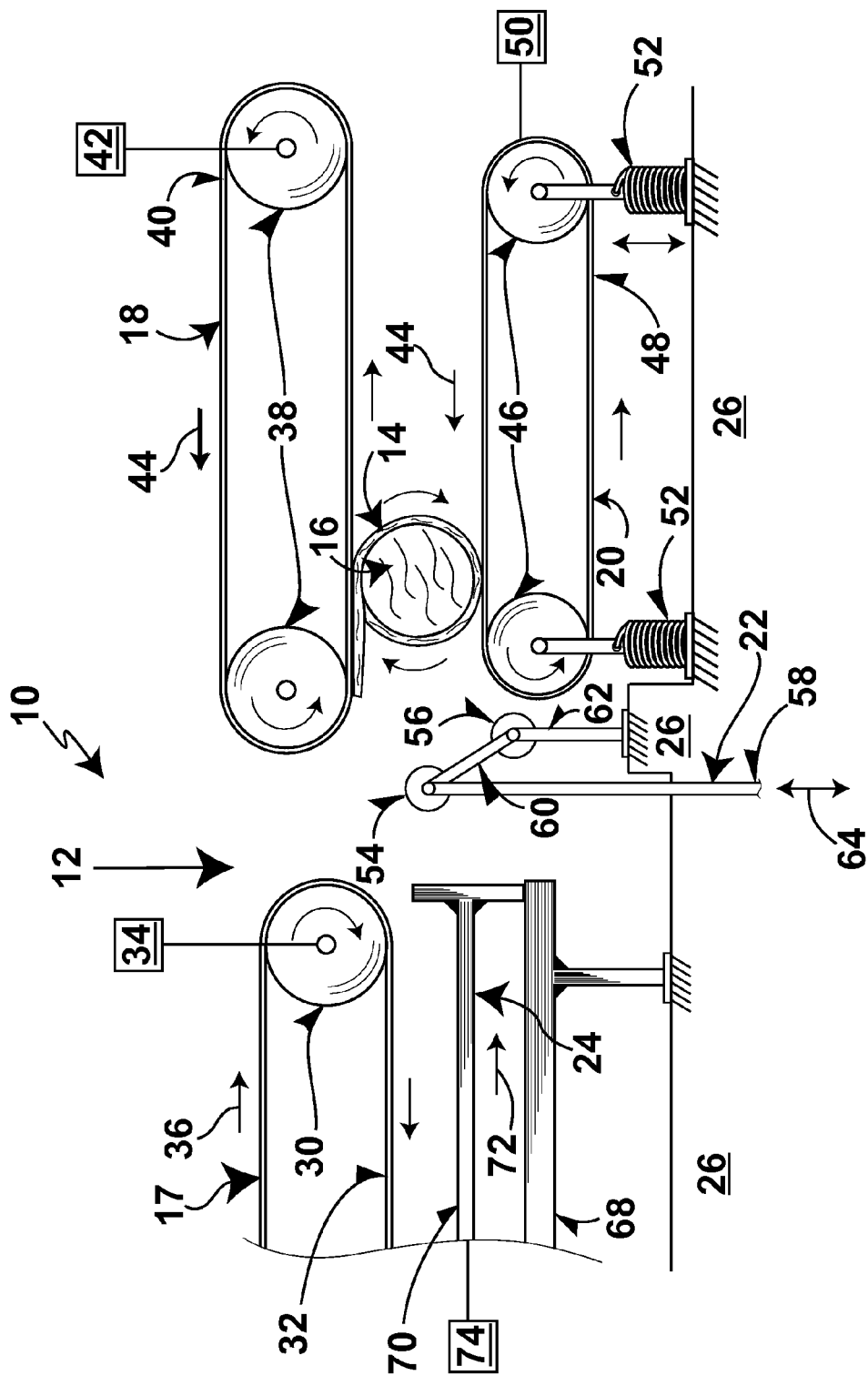
FIG. 6 is an enlarged diagrammatic side elevational view taken generally in the direction of ARROW 6 in FIG. 1 illustrating a next maneuver of the machine of the embodiments of the present invention.

The method for using the machine 10 that utilizes gravity 12 to reduce costs when rolling a food dough casing 14 around a sausage 16, comprises the steps of:

STEP 1: As shown in FIGS. 1, 2, and 8A, position the food dough casing 14 on the belt 32 of the first conveyor 17;

STEP 2: As shown in FIGS. 1, 2, and, 8A, position the sausage 16 on the platform 68 of the pusher block 24;

STEP 3: As shown in FIGS. 3 and 8B, activate the first conveyor 17 so that the food dough casing 14 falls downwardly between, and against, the sausage 16 and the first roller 54 of the carrier 22;

STEP 4: As shown in FIGS. 4 and 8B, push the sausage 16 by the plunger 70 of the pusher block 24 to engage the food dough casing 14 that engages against the first roller 54 of the carrier 22, the second roller 56 of the carrier 22, and the second arm 60 of the carrier 22;

STEP 5: As shown in FIGS. 5 and 8C, raise the first arm 58 of the carrier 22 so that the first roller 54 of the carrier 22 is higher than the second roller 56 of the carrier 22;

STEP 6: As shown in FIGS. 5, 6, and 8C, engage the sausage 16 that is now partially wrapped by the food dough casing 14 between the second conveyor 18 and the third conveyor 20;

STEP 7: As shown in FIGS. 5, 6, and 8C, activate the second conveyor 18 and the third conveyor 20 in opposite directions;

STEP 8: As shown in FIGS. 7 and 8D, roll the sausage 16 that is now partially wrapped by the food dough casing 14 between, and against, the second conveyor 18 and the third conveyor 20 until the food dough casing 14 is fully wrapped around the sausage 16 so as to form a food dough wrapped sausage; and STEP 9: As shown in FIGS. 7 and 8D, exit the food dough wrapped sausage from the machine 10.

D. Impressions.

It will be understood that each of the elements described above or two or more together may also find a useful application in other types of constructions differing from the types described above.

While the embodiments of the present invention have been illustrated and described as embodied in a machine for utilizing gravity to reduce costs when rolling a food dough casing around a sausage, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A machine for utilizing gravity to reduce costs when rolling a food dough casing around a sausage, comprising:
 a) a first conveyor;
 b) a second conveyor;
 c) a third conveyor;
 d) a carrier; and
 e) a pusher block;
 wherein said third conveyor is disposed to one side of said carrier;
 wherein said third conveyor is for rotatably affixing to a horizontal surface;
 wherein said second conveyor is rotatably affixed above said third conveyor;

wherein said pusher block is disposed to the other side of said carrier;

wherein said pusher block is for pushing the sausage towards said carrier, initially;

wherein said first conveyor is rotatably affixed above said pusher block;

wherein said first conveyor is for conveying the food dough casing, initially, and thereafter, the food dough casing falls downwardly by the gravity;

wherein said carrier is disposed between said pusher block and said third conveyor;

wherein said carrier is for rotatably affixing to the horizontal surface; and wherein said carrier is for relaying a partially food dough cased sausage to between said second conveyor and said third conveyor.

2. The machine of claim 1 wherein said pusher block is for slidably affixing to the horizontal surface.

3. The machine of claim 2, wherein said first conveyor, said second conveyor, said third conveyor, and said pusher block are at different elevations for allowing the gravity to assist said machine in reducing costs.

4. The machine of claim 2, wherein said pusher block comprises:
   a) a platform; and
   b) a plunger.

5. The machine of claim 4, wherein said platform of said pusher block is horizontally oriented;
   wherein said platform of said pusher block is for fixedly attaching to the horizontal surface; and
   wherein said platform of said pusher block is for having the sausage roll therealong.

6. The machine of claim 4 wherein said plunger of said pusher block is horizontally oriented;
   wherein said plunger of said pusher block slides along said platform of said pusher block in a direction, which includes both said first direction and said second direction; and
   wherein said plunger of said pusher block is for pushing and rolling the sausage towards said carrier.

7. The machine of claim 4 wherein said pusher block comprises an actuator.

8. The machine of claim 7 wherein said actuator of said pusher block is operatively connected to said plunger of said pusher block.

9. The machine of claim 1, wherein said first conveyor comprises:
   a) a pair of rollers; and
   b) a belt;
   wherein said first conveyor is for conveying the food dough casing, initially.

10. The machine of claim 9, wherein said first conveyor comprises a motor.

11. The machine of claim 10, wherein said motor of said first conveyor is operatively connected to one roller of said first conveyor so as to move said belt of said first conveyor, with the food dough casing thereon, in a first direction towards said second conveyor.

12. The machine of claim 1, wherein said first conveyor is horizontally oriented.

13. The machine of claim 1 wherein said second conveyor comprises:
   a) a pair of rollers; and
   b) a belt.

14. The machine of claim 13, wherein said second conveyor comprises a motor.

15. The machine of claim 14, wherein said motor of said second conveyor is operatively connected to one roller of said second conveyor so as to move said belt of said second conveyor in a second direction towards said first conveyor.

16. The machine of claim 1 wherein said second conveyor is horizontally oriented;
   wherein said second conveyor is positioned parallel to said first conveyor;
   wherein said second conveyor is positioned above said first conveyor; and
   wherein said second conveyor is horizontally spaced from said first conveyor.

17. The machine of claim 1, wherein said third conveyor comprises:
   a) a pair of rollers; and
   b) a belt.

18. The machine of claim 17, wherein said third conveyor comprises a motor.

19. The machine of claim 18, wherein said motor of said third conveyor is operatively connected to one roller of said third conveyor so as to move said belt of said third conveyor in said second direction towards said first conveyor.

20. The machine of claim 17, wherein said third conveyor comprises a plurality of spring dampeners.

21. The machine of claim 20, wherein said plurality of spring dampeners of said third conveyor are operatively connected to said pair of rollers of said third conveyor;
   wherein said plurality of spring dampeners of said third conveyor are for operatively connecting said pair of rollers of said third conveyor to the horizontal surface; and
   wherein said plurality of spring dampeners of said third conveyor are for dampening unwanted movement of said third conveyor relative to the horizontal surface, and to accommodate for increasing the thickness of the dough casing around the sausage.

22. The machine of claim 1, wherein said third conveyor is horizontally oriented;
   wherein said third conveyor is positioned parallel to said first conveyor;
   wherein said third conveyor is positioned parallel to said second conveyor;
   wherein said third conveyor is positioned below said first conveyor;
   wherein said third conveyor is positioned below said second conveyor; and
   wherein said third conveyor is spaced horizontally from said first conveyor.

23. The machine of claim 1, wherein said carrier comprises:
   a) a first roller;
   b) a second roller;
   c) a first arm;
   d) a second arm; and
   e) a third arm.

24. The machine of claim 23 wherein said first roller of said carrier is parallel to said second roller of said carrier; and
   wherein said first roller of said carrier is spaced apart from said second roller of said carrier.

25. The machine of claim 23 wherein said first roller of said carrier is movably attached to said second roller of said carrier by said second arm of said carrier, with said second arm of said carrier moving in a third direction.

26. The machine of claim 23 wherein said third arm of said carrier is rotatably attached to said second roller of said carrier; and wherein said third arm of said carrier is for fixedly attaching to the horizontal surface so as to maintain said second roller of said carrier in a same position relative to the horizontal surface.

27. The machine of claim 23, wherein said first arm of said carrier is movably attached to said first roller; and wherein said first arm of said carrier moves said first roller of said carrier in a vertical direction.

28. The machine of claim 27 wherein said carrier comprises an actuator.

29. The machine of claim 28 wherein said actuator of said carrier is operatively connected to, and disposed below, said first arm of said carrier, and thereby moves said first roller of said carrier in said vertical direction via said first arm of said carrier.

30. A method for using a machine that utilizes gravity to reduce costs when rolling a food dough casing around a sausage, comprising the steps of:
  a) positioning the food dough casing on a belt of a first conveyor of the machine;
  b) positioning the sausage on a platform of a pusher block of the machine;
  c) activating the first conveyor of the machine so that the food dough casing falls downwardly between, and against, the sausage and a first roller of a carrier of the machine;
  d) pushing the sausage by a plunger of the pusher block of the machine to engage the food dough casing that engages against the first roller of the carrier of the machine, a second roller of the carrier of the machine, and a second arm of the carrier of the machine;
  e) raising a first arm of the carrier of the machine so that the first roller of the carrier of the machine is higher than the second roller of the carrier of the machine;
  f) engaging the sausage that is now partially wrapped by the food dough casing between the second conveyor of the machine and the third conveyor of the machine;
  g) activating the second conveyor of the machine and the third conveyor of the machine in opposite directions;
  h) rolling the sausage that is now partially wrapped by the food dough casing between, and against, the second conveyor of the machine and the third conveyor of the machine until the food dough casing is fully wrapped around the sausage so as to form a food dough wrapped sausage; and
  i) exiting the food dough wrapped sausage from the machine.

* * * * *